(12) United States Patent
Corte et al.

(10) Patent No.: US 11,967,159 B2
(45) Date of Patent: Apr. 23, 2024

(54) SEMANTIC ANNOTATION OF SENSOR DATA WITH OVERLAPPING PHYSICAL FEATURES

(71) Applicant: Motional AD LLC, Boston, MA (US)

(72) Inventors: Bartolomeo Della Corte, Parc Riviera (SG); Taigo Maria Bonanni, Jalan Lempeng (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/695,667

(22) Filed: Mar. 15, 2022

(65) Prior Publication Data
US 2023/0237813 A1    Jul. 27, 2023

Related U.S. Application Data

(60) Provisional application No. 63/303,268, filed on Jan. 26, 2022.

(51) Int. Cl.
*G06V 20/56* (2022.01)
*G06V 10/12* (2022.01)
(Continued)

(52) U.S. Cl.
CPC ............ *G06V 20/588* (2022.01); *G06V 10/12* (2022.01); *G06V 10/225* (2022.01);
(Continued)

(58) Field of Classification Search
CPC .... G06V 20/588; G06V 10/421; G06V 10/12; G06V 10/225
See application file for complete search history.

(56) References Cited

U.S. PATENT DOCUMENTS 6,622,085 B1  9/2003  Amita et al.
2013/0328924 A1*  12/2013  Arikan ............... G01C 21/3815
                                                        345/629
(Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
(Continued)

*Primary Examiner* — David Perlman
(74) *Attorney, Agent, or Firm* — Fish & Richardson P.C.

(57) ABSTRACT

A method for semantic annotation of sensor data may include obtaining sensor data representing an image of a geographic area. The boundary points defining a first polygon in the image of the geographic area may be determined based on the sensor data. An overlap between the first polygon and a second polygon in the image of the geographic area may be detected based at least on the boundary points defining the first polygon. At least one of the first polygon or the second polygon may be modified to remove the overlap between the first polygon and the second polygon. An annotation corresponding to the first polygon may be generated based on the modifying of at least one of the first polygon or the second polygon. The annotation may identify a physical feature within the geographic area. Related systems and computer program products are also provided.

20 Claims, 14 Drawing Sheets

(51) Int. Cl.
G06V 10/22 (2022.01)
G06V 10/26 (2022.01)
G06V 10/42 (2022.01)

(52) U.S. Cl.
CPC .......... G06V 10/267 (2022.01); G06V 10/421 (2022.01); G06V 2201/07 (2022.01)

(56) References Cited

U.S. PATENT DOCUMENTS

2020/0118283 A1* 4/2020 Lee .................. G06V 20/58
2021/0331671 A1* 10/2021 Kumano .................. G08G 1/16
2022/0219700 A1* 7/2022 Tsukamoto ....... B60W 60/0025

OTHER PUBLICATIONS

G2.com [online], "Top 10 OpenStreetMap Alternatives & Competitors," available on or before Feb. 25, 2023, via Internet Archive: Wayback Machine URL <https://web.archive.org/web/20230225213224/https://www.g2.com/products/openstreetmap/competitors/alternatives>, retrieved Oct. 30, 2023, URL <https://www.g2.com/products/openstreetmap/competitors/alternatives>, 6 pages.

International Search Report and Written Opinion in International Appln. No. PCT/US2023/011129, mailed on May 12, 2023, 10 pages.

Pizzati et al., "Enhanced free space detection in multiple lanes based on single CNN with scene identification," 2019 IEEE Intelligent Vehicles Symposium (Iv), IEEE, Paris, France, Jun. 9-12, 2019, pp. 2536-2541.

* cited by examiner

SEMANTIC ANNOTATION OF SENSOR DATA WITH OVERLAPPING PHYSICAL FEATURES

CROSS REFERENCE TO RELATED APPLICATION

This application claims priority to U.S. Provisional Application No. 63/303,268, entitled "SEMANTIC ANNOTATION OF SENSOR DATA WITH OVERLAPPING PHYSICAL FEATURES" and filed on Jan. 26, 2022, the disclosure of which is incorporated herein by reference in its entirety.

BACKGROUND

An autonomous vehicle may be capable of sensing its surrounding environment and navigating with minimal to no human input. In order to safely traverse a selected path while avoiding obstacles that may be present along the way, the vehicle may rely on various types of maps. The maps may include semantic labels that enable the vehicle to distinguish between different physical features present in the vehicle's surrounding environment. Nevertheless, annotating a map, such as a birds-eye map or a street-level map, to include accurate and consistent semantic labels can be a difficult and resource-intensive task.

DETAILED DESCRIPTION

Figure 1:
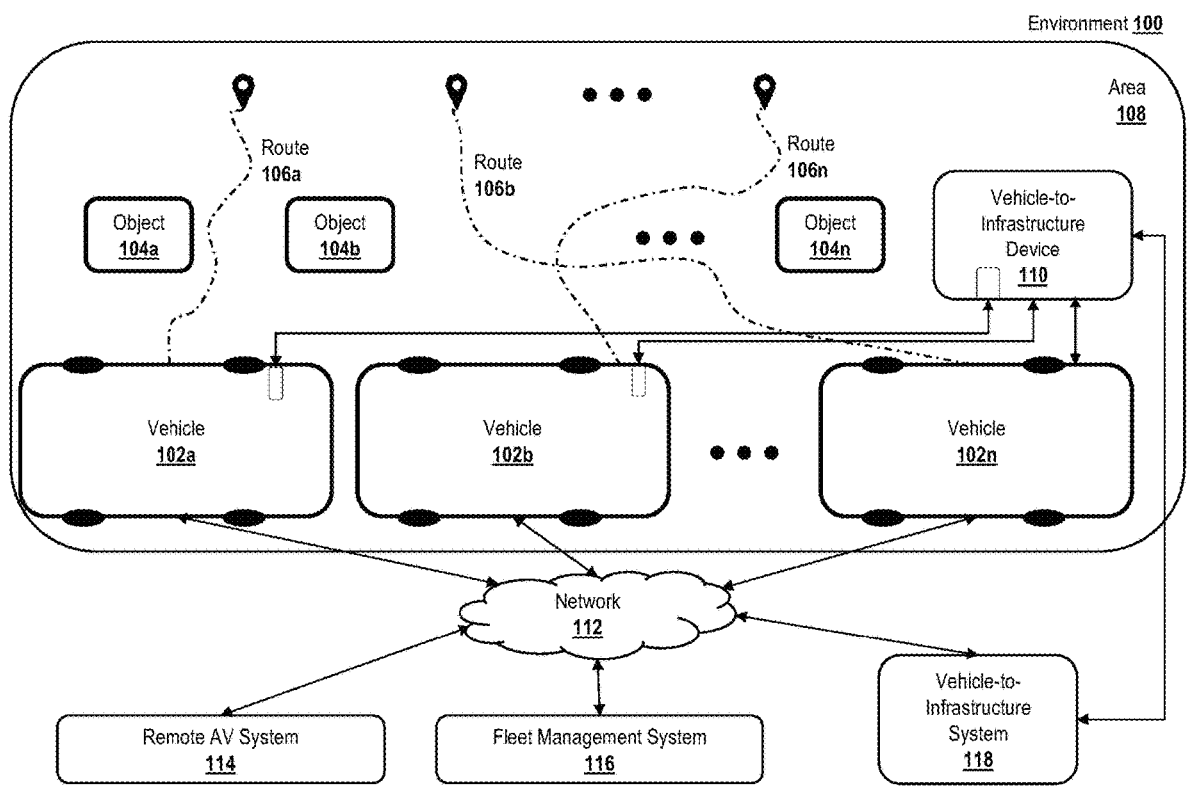
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement semantic annotation of sensor data. A vehicle (e.g., an autonomous vehicle) may utilize sensor data for navigation, localization, and/or the like. The sensor data may be annotated to include one or more semantic labels identifying the physical features that are present in a geographical area around the vehicle. For example, the semantic labels may be generated based on the geographic data and a drivability mask (e.g., a top-view drivable mask) identifying areas (e.g., surfaces) where the vehicle can drive. In some instances, the drivability mask may be generated based on sensor data, which may include one or more images of the geographic area including, for example, a birds-eye view image, a street-level image, a point cloud image, and/or the like.

Semantic annotation adds, to the sensor data, semantic labels representative of the meaning and context of that sensor data. Semantic understanding, in turn, enables a machine (e.g., the vehicle or one or more related systems) to process and interpret the sensor data as a human might. Accordingly, semantic understanding represents a specific type of "computer vision"—a field of technology that attempts to enable computers to "see" the world in a manner similar to a human being. As described above, sensor data may represent an image of a geographic area around the vehicle (e.g., a birds-eye image, a street-level image, a point cloud image, and/or the like). Semantic annotations may designate certain portions of that image as representing one or more physical features present within the geographic area around the vehicle. For example, an area in the image may be assigned a semantic label designating that area as a traffic lane (e.g., a drivable surface for motorized vehicles, for bikes, etc.), a crosswalk, an intersection, a traffic signal, a traffic sign, and/or the like. However, overlaps between multiple physical features, such as when two or more traffic lanes merge or intersect, can prevent an accurate and consistent assignment of semantic labels to the physical features present within geographic data.

By virtue of the implementation of systems, methods, and computer program products described herein, techniques for processing sensor data for annotation may be provided. Semantic understanding of physical features present within the sensor data may be important for a number of tasks including programmatic navigation of a corresponding geographic area by a vehicle. As discussed in more detail below, the present disclosure relates to an improvement in generating semantic labels for sensor data, which includes techniques for improving differentiation of different physical features present in the sensor data.

The embodiments disclosed herein improve the ability of computing systems, such as computing devices included within or supporting operation of a vehicle (e.g., an autonomous vehicle), to annotate sensor data with semantic labels that enables the vehicle to distinguish between different physical features within a geographic area around the vehicle. Moreover, the presently disclosed embodiments address technical problems inherent within computing systems including the difficulty of programmatically extracting physical features from sensor data when two or more physical features overlap. These technical problems are addressed by the various technical solutions described herein, including techniques for processing sensor data to improve differentiation between different physical features present in the sensor data. Annotations performed based on the processed sensor data may enable the assignment of more accurate and consistent semantic labels.

As used herein, the term "semantic annotation" is used to denote information that extends beyond sensor data to provide semantic understanding of at least a portion of that sensor data, thus providing for example a meaning or context of the data. Examples of semantic annotations are provided herein, such as information designating a portion of sensor data as a given physical feature. Embodiments of the present disclosure may be of use in self-driving vehicles. For that reason, some examples are provided herein of semantic annotations and physical features that may be of particular use to self-driving vehicles, such as crosswalks, traffic lanes, traffic signals, etc. However, embodiments of the present disclosure may additionally or alternatively be used to generate validated semantic understanding for other physical features or objects, such as the identification of cars, people, bicycles, etc.

The term "sensor data," as used herein, refers to data generated by or generally derivable from sensors (e.g., sensors from an autonomous system that is the same as or similar to autonomous system 202, described below) that reflect the physical world. For example, sensor data may refer to raw data (e.g., the bits generated by a sensor) or to data points, images, point cloud, electronic map data of a geographic area, etc., generated from such raw data. As an illustrative example, sensor data may refer to a "ground-level" or "street-level" image, such as an image directly captured by a camera, a point cloud generated from a LiDAR sensor, a "birds-eye view" (e.g., top-view) image or map generated by movement of a sensor through a geographic area, or the like. In some instances, semantic annotations may be used to modify such images in a manner that identifies features of the images.

The term "geographic data," as used herein, refers to graph-based geographic data (sometimes referred to as geospatial data, georeferenced data, geoinformation, or geodata) in which traffic lanes are represented as edges (e.g., undirected edges) and intersections between traffic lanes are represented as nodes. Examples of geographic data include OpenStreetMap (OSM) project data, Google Maps data, HERE map data, or the like.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
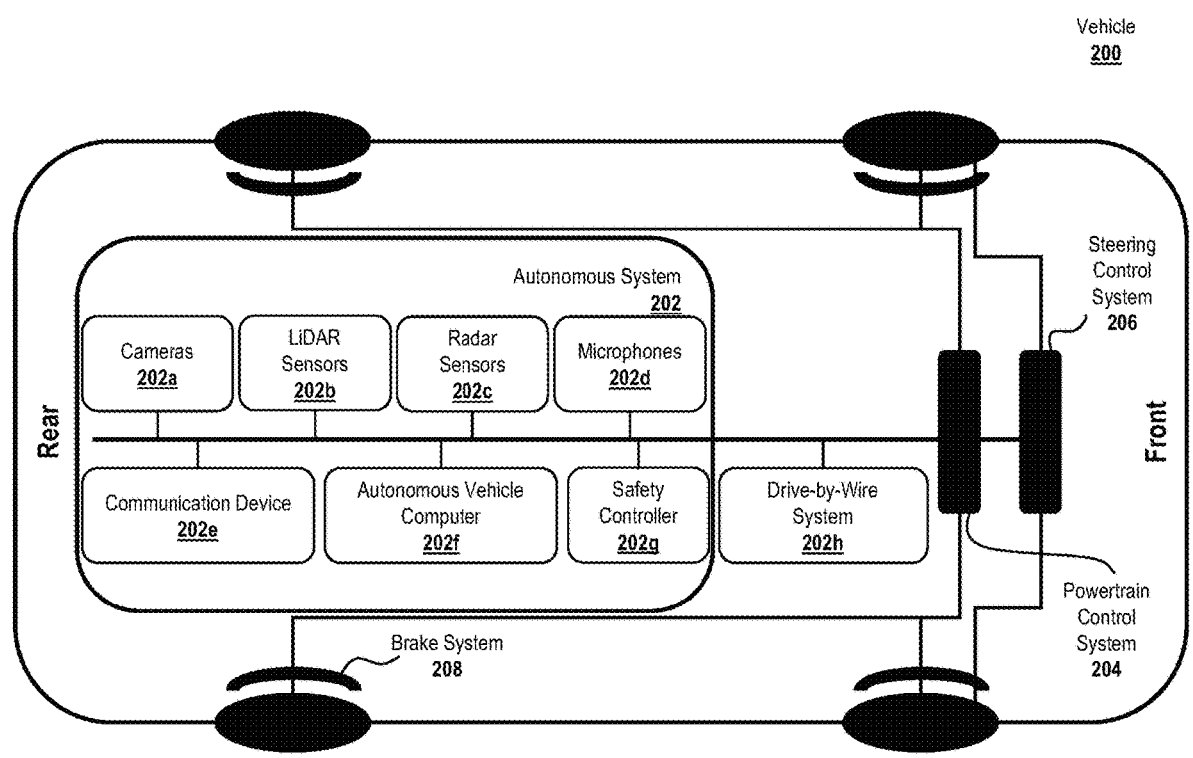
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle computer 202f, and drive-by-wire (DBW) system 202h.

Figure 3:
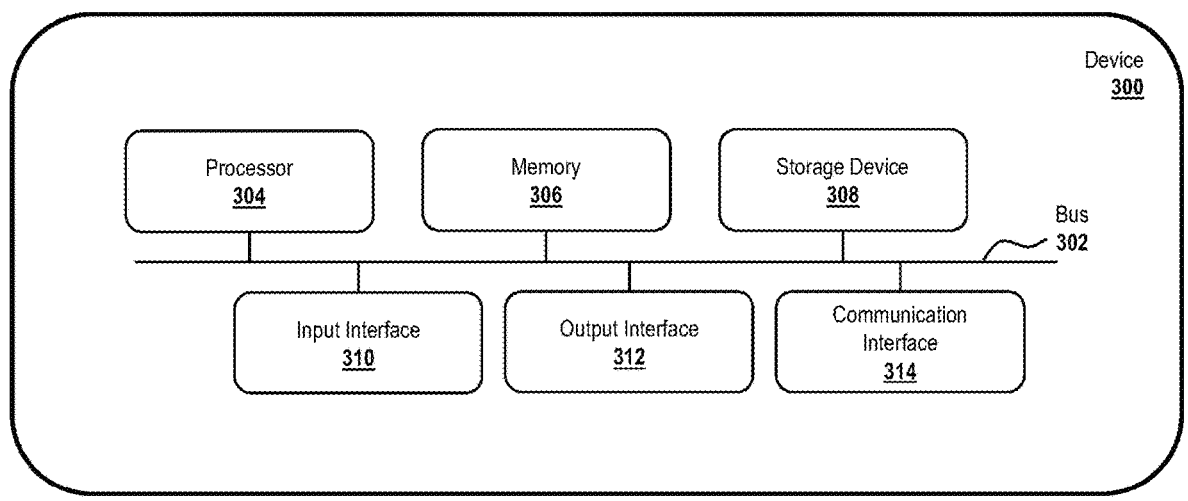
FIG. 3 is a diagram of components of one or more devices and/or one or more systems of FIGS. 1 and 2.

Cameras 202a include at least one device configured to be in communication with communication device 202e, autonomous vehicle computer 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle computer 202f and/or a fleet management system (e.g., a fleet management system that is the same as or similar to fleet management system 116 of FIG. 1). In such an example, autonomous vehicle computer 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle computer 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle computer 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle computer 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle computer 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle computer 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle computer 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle computer 202f is the same as or similar to autonomous vehicle computer 400, described herein. Additionally, or alternatively, in some embodiments autonomous vehicle computer 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle computer 202f.

DBW system 202h includes at least one device configured to be in communication with communication device 202e and/or autonomous vehicle computer 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of vehicle-to-infrastructure (V2I) device 110, and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
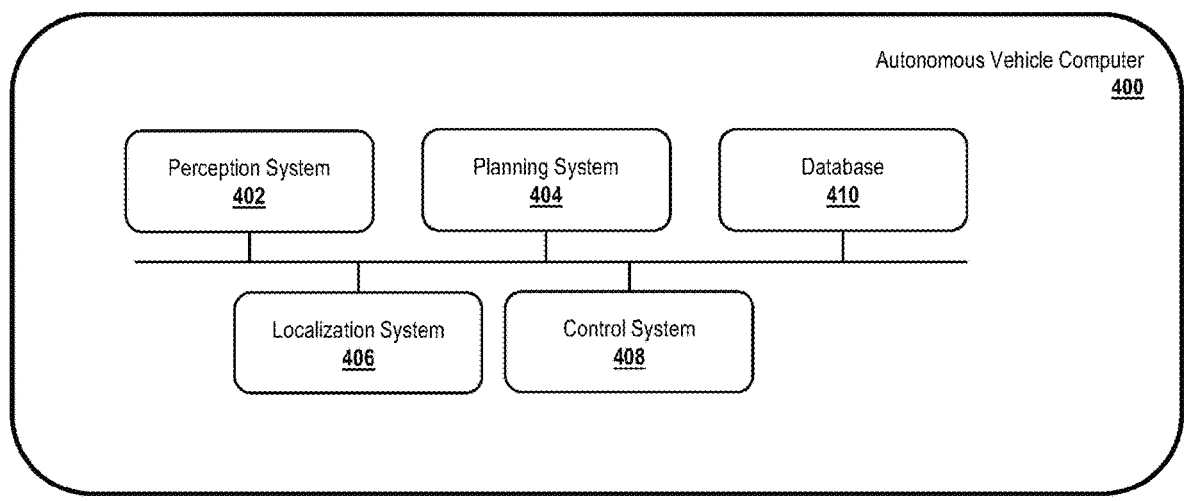
FIG. 4A is a diagram of certain components of an autonomous system.

Referring now to FIG. 4A, illustrated is an example block diagram of an autonomous vehicle computer 400 (sometimes referred to as an "AV stack"). As illustrated, autonomous vehicle computer 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle computer 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle computer 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle computer 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle computer 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle computer 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
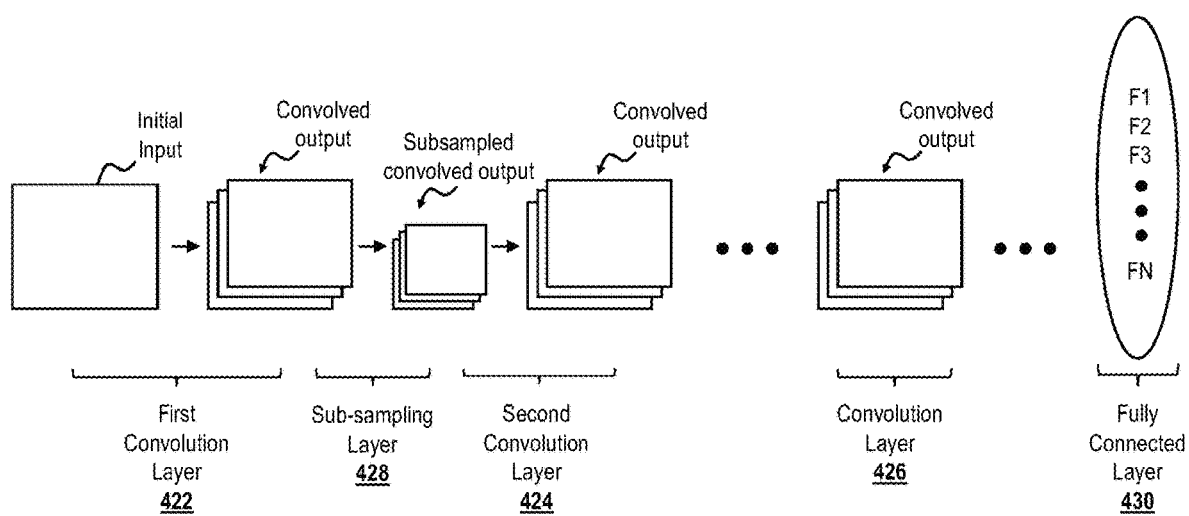
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
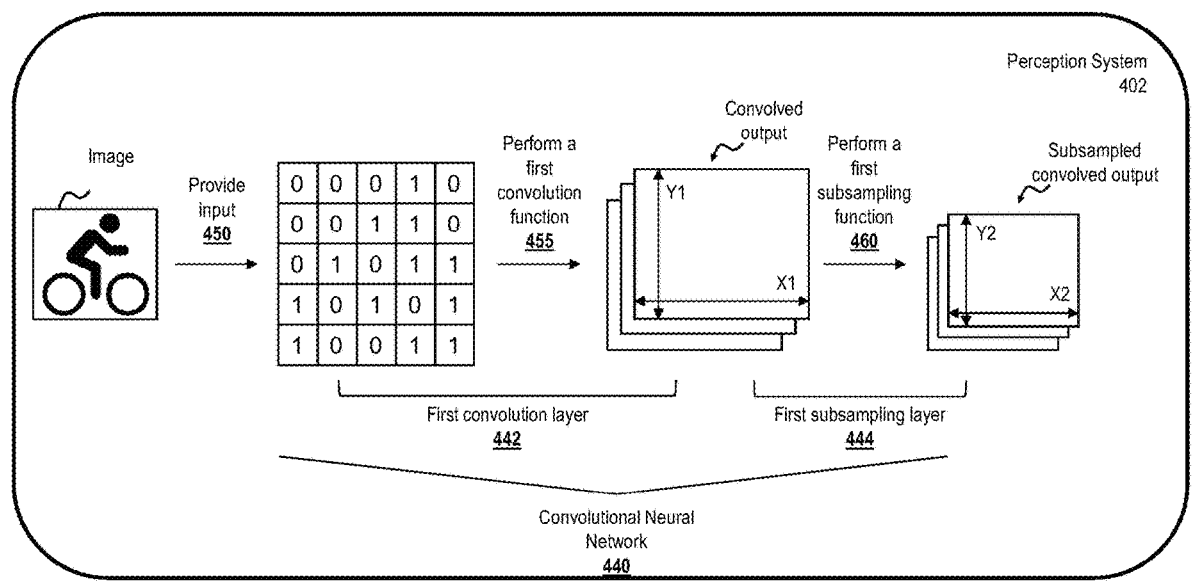
FIGS. 4C and 4D are a diagram illustrating example operation of a convolutional neural network (CNN)
Figure 4D:
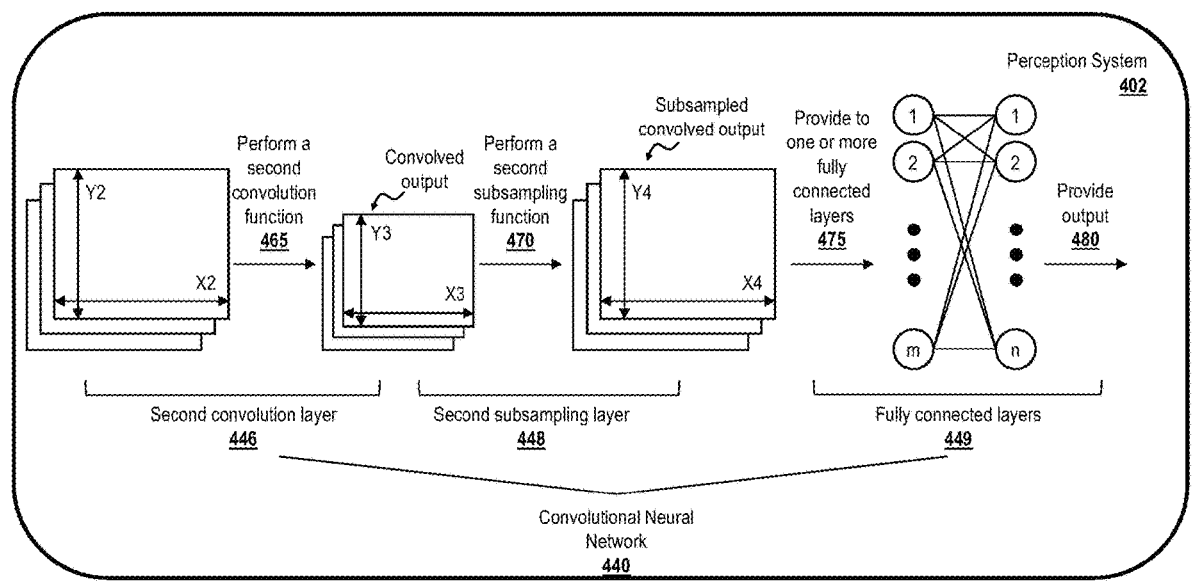

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Referring now to FIGS. 5A-5E, illustrated are diagrams of an implementation of a process for semantic annotation, which includes processing sensor data to improve differentiation between different physical features present in the sensor data.

Figure 5A:
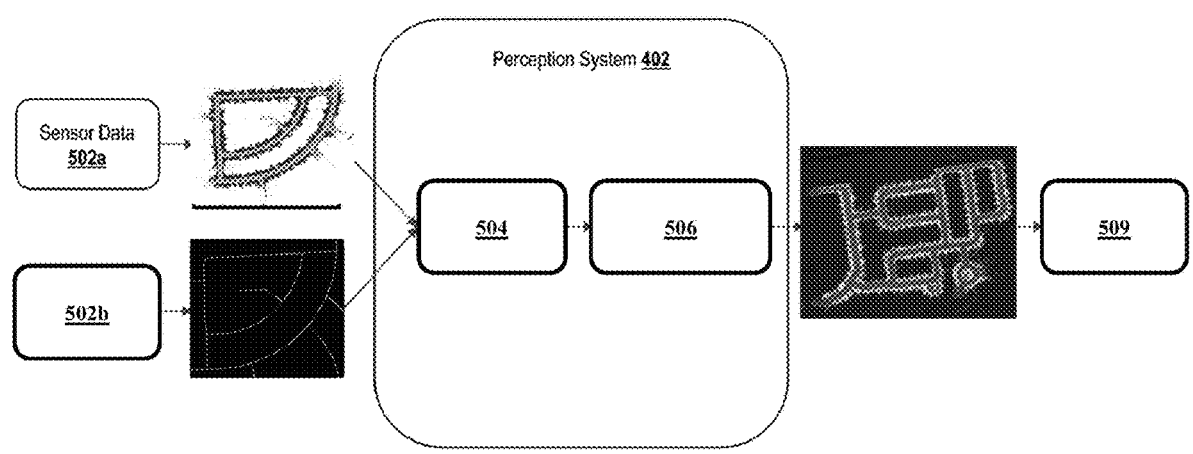
FIG. 5A is a block diagram illustrating an example of a perception system for generating semantic annotations for a geographic area.

With reference to FIG. 5A, interactions for generating semantic labels are illustratively implemented by perception system 402, which as noted above may be included within vehicle 102. Thus, the interactions of FIG. 5A may be used, for example, to provide vehicle 102 with semantic understanding of the surrounding geographic area, thus enabling various systems (e.g., autonomous vehicle computer 202f) to perform functions such as planning of routes 106b, determining a location of the vehicle 102 within a geographic area, and/or the like.

The interactions of FIG. 5A include passing, to a physical feature extractor 504, sensor data 502a and geographic data 502b associated with a geographic area. As described above, the sensor data 502a may include one or more images of the geographic area from which a drivability mask identifying drivable surfaces can be derived. Meanwhile, the geographic data 502b may include graph-based geographic data in which edges represent traffic lanes and nodes represent intersections between traffic lanes. The sensor data 502a, which may include one or more images of the geographic area, may be overlap with the geographic data 502b. For example, an edge representative of a traffic lane in the geographic data 502b may correspond to a polygon representative of a drivable surface in the sensor data 502a. The physical feature extractor 504 may extract, based on the sensor data 502a and geographic data 502b, one or more physical features present within the sensor data 502a including, for example, traffic lanes, intersections, and/or the like. The physical feature extractor 504 may generate a processed image 509 in which each traffic lane is identified by the boundary points of a corresponding polygon (e.g., lane polygon). As discussed in more detail below, the physical feature extractor 504 may process the sensor data 502a in order to improve differentiation between different physical features present in the sensor data 502, particularly where multiple traffic lanes intersect or merge. For instance, the physical feature extractor 504 may perform, based on the sensor data 502a and/or the geographic data 502b, one or more of traffic lane extraction, traffic lane edge filtering, overlapping traffic lane filtering, intersection extraction, and lane section linking.

Referring again to FIG. 5A, perception system 402 may also include an annotation engine 506 configured to generate semantic labels for the physical features that are present in the sensor data 502. In some instances, the semantic annotation may be performed by a trained machine learning model, such as a neural network, in which case the sensor data 502a may be represented as set of aligned 2-dimensional matrixes, with each such matrix representing a layer of an image. For example, a color image may be represented in 3 channels, each of which corresponding to values of a respective primary color that, when combined, result in an image. A greyscale image may be represented as a single matrix, with values within the matrix representing the darkness of a pixel in the image.

In some embodiments, the annotation engine 506 may generate semantic labels based on the processed image 509 that the physical feature extractor 504 has processed to improve differentiation between different physical features. To differentiate between different physical features, the physical feature extractor 504 may add, to the sensor data 502a and/or geographic data 502b, one or more additional layers of information. For example, a first layer may be added to the sensor data 502a to indicate whether each location in the matrix (e.g., each "pixel" in the sensor data 502a) corresponds to an intersection (e.g., via concatenation of an image showing nodes in a graph of roads), a second layer may be added to indicate whether each location corresponds to a traffic lane (e.g., via concatenation of an image showing edges in the graph), a third layer may be added that indicates whether each location corresponds to a crosswalk, and/or the like.

Figure 5B:
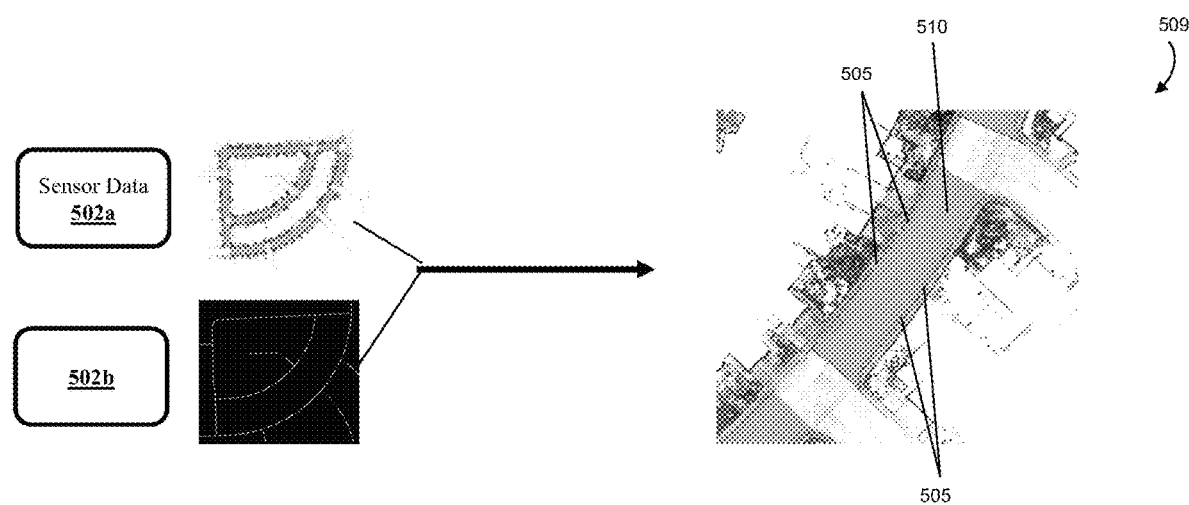
FIG. 5B is a diagram illustrating an example process of traffic lane extraction from sensor data and/or geographic data.

FIG. 5B depicts a diagram illustrating an example process of traffic lane extraction from sensor data 502a and/or geographic data 502b. As shown, sensor data 502a and geographic data 502b may be processed by a processing system (e.g., physical feature extractor 504 of perception system 402) to generate a processed image 509 in which each traffic lane is identified by the boundary points of a corresponding polygon (e.g., lane polygon). For example, the physical feature extractor 504 may determine, for each traffic lane represented as an edge in the geographic data 502b, the boundary points 505 of the corresponding polygon 510. In the example of FIG. 5B, the processed image 509 includes boundary points 505 of a first polygon 510.

In some aspects, the physical feature extractor 504 may determine the bounding edges of a polygon defining a first traffic lane by at least determining where the first traffic lane intersects with a second traffic lane based on a distance between boundary points defining opposite edges of the first traffic lane. For example, the physical feature extractor 504 may determine that the first traffic lane is intersecting the second traffic lane when the distance between the boundary points defining opposite edges of the first traffic lane exceeds a threshold defined by the typical width of a traffic lane. Accordingly, a first plurality of boundary points 505 defining the first polygon 510 may be determined to include a first boundary point on a first edge of the first polygon and a second boundary point on a second edge of the first polygon based on a distance between the first boundary point and the second boundary point satisfying a threshold. In some instances, the typical width of traffic lanes may be determined based on a frequency distribution of a width of traffic lanes. For instance, the physical feature extractor 504 may apply a histogram indicating, for a variety of width, the frequency of encountering traffic lanes exhibiting each width. The physical feature extractor 504 may apply the histogram in order to determine the threshold for determining when one traffic lane is intersecting another traffic lane. Moreover, boundary points that fail to satisfy the threshold may be excluded from the polygon defining the traffic lane, thus reducing the quantity of boundary points included in the polygon.

Figure 5C:
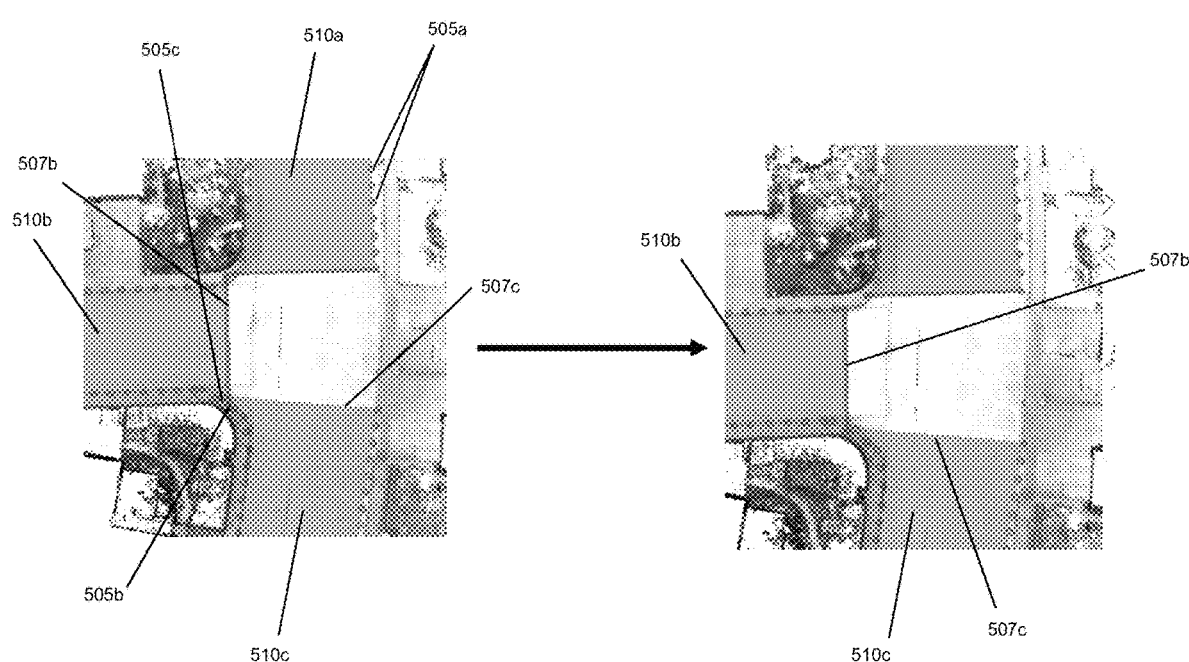
FIG. 5C is a diagram illustrating an example process of filtering lane edges.

FIG. 5C depicts a diagram illustrating an example process of filtering lane edges. Lane polygons 510 may be generated as illustrated in the example of FIG. 5B. In the example of FIG. 5C, a first lane polygon 510a includes a first boundary point 505a, a second polygon 510b includes a second boundary point 505b, and a third lane polygon includes 510c a third boundary point 505c. As further shown, the second lane polygon 510b includes a first edge 507b and the third lane polygon 510c includes a second edge 507c. On the left-hand side of the example in FIG. 5C, the first edge 507b of the second lane polygon 510b intersects the second edge 507c of the third lane polygon 510c, giving rise to an intersection between the second lane polygon 510b and the third lane polygon 510c in which the third boundary point 505c of the third polygon 510c falls within the second lane polygon 510b while the second boundary point 505b of the second lane polygon 510b falls within the third lane polygon 510c. Such lane polygon intersection artifacts may interfere the accuracy and consistency of subsequent semantic annotations. As such, in some embodiments, the physical feature extractor 504 may remove lane polygon intersections. For example, as shown on the right hand side of the example in FIG. 5C, lane polygons identified as intersecting one another (e.g., the second lane polygon 510b and the third lane polygon 510c) may be reduced in size to prevent their edges (e.g., the first edge 507b and the second edge 507c) from intersecting.

Figure 5D:
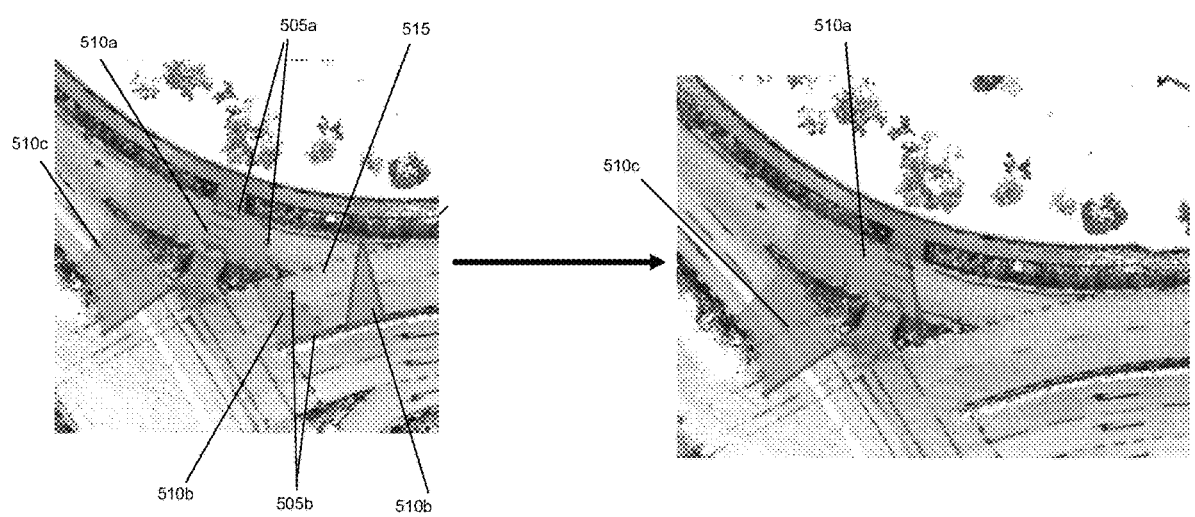
FIG. 5D is a diagram illustrating an example process of filtering overlapping lane polygons.

FIG. 5D depicts a diagram illustrating an example process of filtering overlapping lane polygons. In some aspects and depending on a road network, lane polygons (e.g., first lane polygon 510a, second lane polygon 510b, and/or third lane polygon 510c) extracted from the sensor data 502a and/or the geographic data 502b may overlap. Overlapping lane polygons may cause ambiguities with respect to physical features, drivable areas, or the like. As such, it may be beneficial to eliminate overlapping regions. In the example of FIG. 5D, a first polygon 510a overlaps with a second polygon 510b in a region 515. As shown on the left-hand side of FIG. 5D, the overlapping region 515 may be removed (e.g., using the perception system 402) from the first polygon 510a and the second polygon 510b. After removing the overlapping region 515, a processing system (e.g., the physical feature extractor 504 of perception system 402) may attempt to reconstruct the first lane polygon 510a using the remaining boundary points 505a as well as attempt to reconstruct the second lane polygon 510b using the remaining boundary boundary points 505b. If a lane polygon cannot be reconstructed, then the perception system 402 may remove the lane polygon altogether including by removing the remaining portions of the lane polygon. For instance, FIG. 5D shows that the second lane polygon 510b (e.g., the portions of second lane polygon 510b that remain after the removal of the overlapping region 515) is removed as because the second lane polygon 510b cannot be reconstructed with the boundary points 505b that remain subsequent to the removal of the overlapping region 515.

Figure 5E:
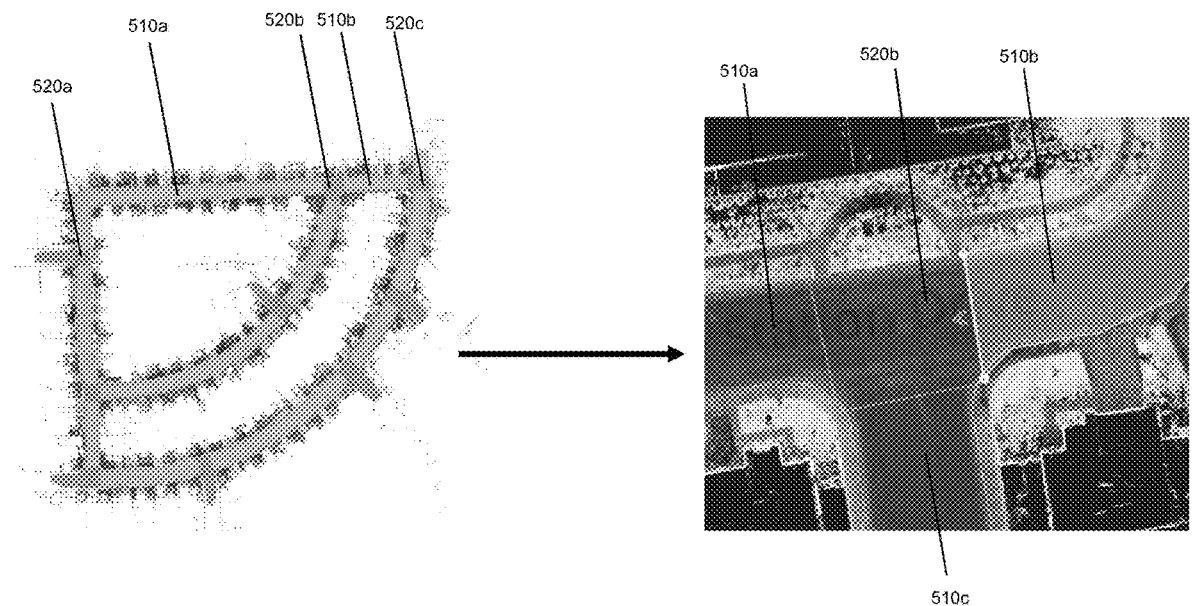
FIG. 5E is a diagram illustrating an example process of filtering and linking lane intersections.

FIG. 5E depicts a diagram illustrating an example process of filtering and linking lane intersections. As shown on the left-hand side of FIG. 5E, once all lanes (e.g., lane polygons 510) have been extracted and filtered, intersection polygons 520, such as first intersection polygon 520a, second intersection polygon 520b, and third intersection polygon 520c, may be extracted. In some aspects, intersection extraction may be performed by removing, from the drivable surface, areas covered by traffic lanes (e.g., lane polygons 510) and filling in the empty spaces in the drivable area.

As shown on the right-hand side of FIG. 5E, the physical feature extractor 504 may link the contours of the intersection polygons 520 with the edges of the lane polygon 510 connected thereto (e.g., the first lane polygon 510a and the second lane polygon 510b). As shown in the example of FIG. 5E, the first lane polygon 510a, the second lane polygon 510b, and the third lane polygon 510c may border the second intersection polygon 520b. Accordingly, the physical feature extractor 504 may merge edges of the first polygon 510a, the second polygon 510b, and the third polygon 510c that border the second intersection polygon 520b to contours of the second intersection polygon 520b such that the lane polygons 510 and the intersection polygon 520b share at least one boundary point.

Figure 5F:
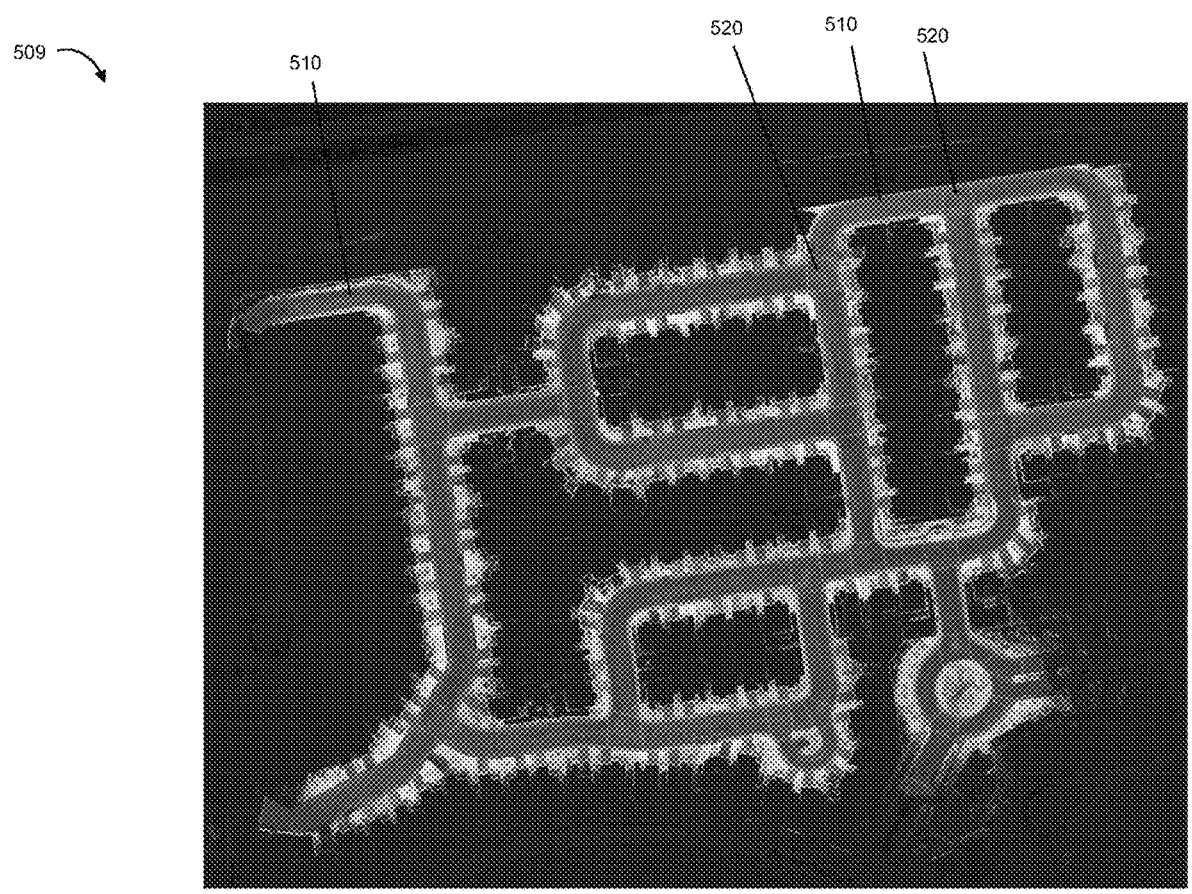
FIG. 5F is an example processed image generated by a physical feature extractor.

FIG. 5F depicts an example processed image 509 generated by the physical feature extractor 504 by performing, based on the sensor data 502a and/or the geographic data 502b, one or more of traffic lane extraction, traffic lane edge filtering, overlapping traffic lane filtering, intersection extraction, and lane section linking. For example, the example of the processed image 509 shown in FIG. 5F may include polygons identifying one or more traffic lanes, intersections, and/or the like. In some embodiments, the annotation engine 506 may generate, based at least on the processed image 509, one or more semantic labels for the physical features present therein. For example, the annotation engine 506 may generate semantic labels that identify the physical features (e.g., traffic lane, intersection, and/or the like) corresponding to the polygons included in the processed image 509.

Figure 6:
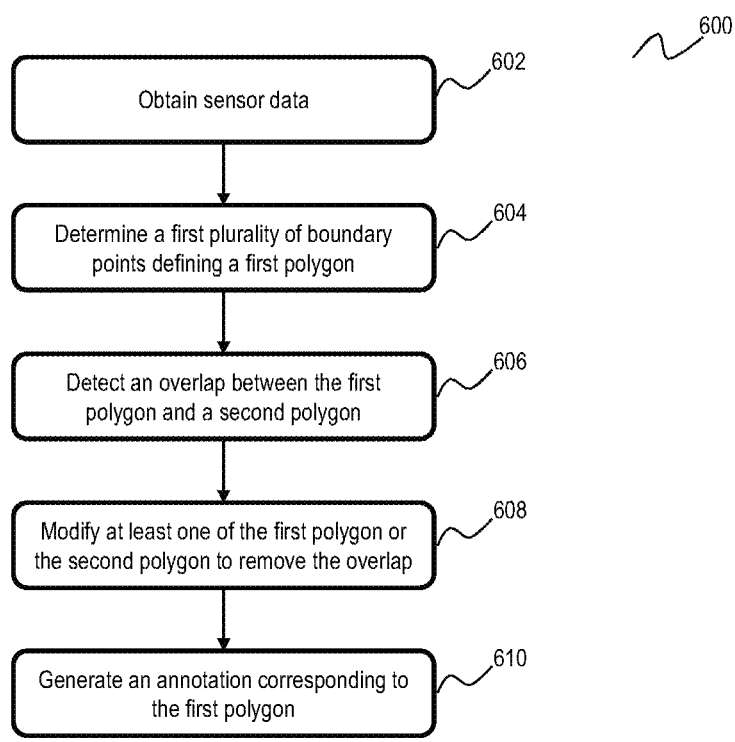
FIG. 6 is a flowchart illustrating an example of a process for annotating sensor data.

With reference to FIG. 6, an illustrative process 600 will be described for annotating sensor data (e.g., sensor data 502a). The process 600 may be implemented by the autonomous vehicle computer 400 of FIG. 4A including, for example, the perception system 402.

In the example of FIG. 6, the process 600 begins at block 602, where the autonomous vehicle computer 400 obtains sensor data (e.g., sensor data 502a). The sensor data may represent an image of a geographic area. In some aspects, the perception system 402 obtains the sensor data. Sensor data may include data generated by or generally derivable from a sensor. For example, the image may be a birds-eye view (e.g., top-view) of an area around a vehicle 102, a ground-level view from a camera on the vehicle 102, a point cloud generated based on LiDAR sensors on the vehicle 102, etc. In one embodiment, the image of the geographic area includes at least one of a birds-eye view image, a ground-level image, or a point cloud image.

At block 604, the autonomous vehicle computer 400 determines, based on the sensor data, a first plurality of boundary points defining a first polygon. The first polygon may be included in the image of the geographic area. In some aspects, the first polygon may define a traffic lane such as a road, a street, or another pathway. The first plurality of boundary points defining the first polygon may be determined to include a first boundary point on a first edge of the first polygon and a second boundary point on a second edge of the first polygon based on a distance between the first boundary point and the second boundary point satisfying a threshold determined based on a frequency distribution of the widths of traffic lanes.

At block 606, the autonomous vehicle computer 400 detects an overlap between the first polygon and a second polygon. For example, the overlap may represent an overlapping region of lanes of one or more roads. The overlap may include an intersection between a first edge of the first polygon and a second edge of the second polygon. The overlap may include an intersection between a first region of the first polygon and a second region of the second polygon. In some aspects, each of the first polygon and the second polygon include at least a portion of a traffic lane and a third polygon includes an intersection between two or more traffic lanes.

At block 608, the autonomous vehicle computer 400 modifies at least one of the first polygon or the second polygon. In some aspects, the modifying may include reducing the at least one of the first polygon or the second polygon to prevent the first edge from intersecting the second edge. For example, at least one of the first polygon or the second polygon may be reduced by adjusting at least one of the first plurality of boundary points including the first polygon or a second plurality of boundary points including the second polygon. In some aspects, the modifying may include removing the first region from the first polygon and removing the second region from the second polygon.

At block 610, the autonomous vehicle computer 400 generates an annotation corresponding to the first polygon. For example, the annotation may identify a physical feature within the geographic area that corresponds to the first polygon. The physical feature may include a traffic lane (e.g., a drivable surface for motorized vehicles, for bikes, etc.), a cross walk, an intersection, a traffic signal, a traffic sign, and/or the like.

In some aspects, the process 600 may further include determining, using the at least one processor, that a polygon cannot be constructed from a remaining plurality of boundary points upon removing the first region from the first polygon. The process 600 may further include in response to determining that the polygon cannot be reconstructed from the remaining plurality of boundary points upon removing the first region from the first polygon, modifying the first polygon by removing the first polygon from the image. The process 600 may further include identifying, using the at least one processor and based on the modified image, a third polygon corresponding to an empty space between the first polygon and the second polygon. The process 600 may further include generating, using the at least one processor, a second annotation corresponding to the third polygon, the second annotation identifying another physical feature within the geographic area. The process 600 may further include merging a first edge of the first polygon and a second edge of the second polygon with a contour of at least a portion of the third polygon such that each of the first polygon and the second polygon share at least one boundary point with the third polygon.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    obtaining, using at least one processor, sensor data representing an image of a geographic area;
    determining, using the at least one processor and based on the sensor data, a first plurality of boundary points defining a first polygon in the image of the geographic area;
    detecting, using the at least one processor and based at least on the first plurality of boundary points, an overlap between the first polygon and a second polygon in the image of the geographic area, wherein the overlap comprises an intersection between a first region of the first polygon and a second region of the second polygon;
    in response to detecting the overlap, modifying, using the at least one processor, at least one of the first polygon or the second polygon to remove the overlap between the first polygon and the second polygon;
    determining, using the at least one processor, a reconstruction limitation of the at least one of the first polygon or the second polygon associated with a removal of the overlap between the first polygon and the second polygon;
    removing, using the at least one processor, the at least one of the first polygon or the second polygon associated with the reconstruction limitation; and
    generating, using the at least one processor and based on the removing of the at least one of the first polygon or the second polygon, a first annotation corresponding to the first polygon, the first annotation identifying a physical feature within the geographic area.

2. The method of claim 1, wherein the overlap comprises an intersection between a first edge of the first polygon and a second edge of the second polygon, and wherein the modifying includes reducing, using the at least one processor, the at least one of the first polygon or the second polygon to prevent the first edge from intersecting the second edge.

3. The method of claim 1, wherein the at least one of the first polygon or the second polygon are reduced by adjusting at least one of the first plurality of boundary points comprising the first polygon or a second plurality of boundary points comprising the second polygon.

4. The method of claim 1, wherein the overlap comprises an intersection between a first region of the first polygon and a second region of the second polygon, and wherein the modifying includes removing the first region from the first polygon and the second region from the second polygon.

5. The method of claim 4, further comprising:
    determining, using the at least one processor, that a polygon cannot be constructed from a remaining plurality of boundary points upon removing the first region from the first polygon; and
    in response to determining that the polygon cannot be reconstructed from the remaining plurality of boundary points upon removing the first region from the first polygon, modifying the first polygon by removing the first polygon from the image.

6. The method of claim 1, further comprising:
    identifying, using the at least one processor and based on the modifying, a third polygon corresponding to an empty space between the first polygon and the second polygon; and
    generating, using the at least one processor, a second annotation corresponding to the third polygon, the second annotation identifying another physical feature within the geographic area.

7. The method of claim 6, wherein each of the first polygon and the second polygon comprise at least a portion of a traffic lane, and wherein the third polygon comprises an intersection between two or more traffic lanes.

8. The method of claim 6, further comprising:
    merging a first edge of the first polygon and a second edge of the second polygon with a contour of at least a portion of the third polygon such that each of the first polygon and the second polygon share at least one boundary point with the third polygon.

9. The method of claim 1, wherein the first plurality of boundary points defining the first polygon are determined to include a first boundary point on a first edge of the first polygon and a second boundary point on a second edge of the first polygon based on a distance between the first boundary point and the second boundary point satisfying a threshold.

10. The method of claim 9, wherein the distance between the first boundary point and the second boundary point are determined to satisfy the threshold based on a frequency distribution of a width of traffic lanes.

11. The method of claim 1, wherein the image of the geographic area comprises at least one of a birds-eye view image, a street-level image, or a point cloud image.

12. The method of claim 1, wherein the sensor data comprises electronic map data of the geographic area.

13. A system, comprising:
    at least one processor, and
    at least one non-transitory storage media storing instructions that, when executed by the at least one processor, cause the at least one processor to at least:
        obtain sensor data representing an image of a geographic area;
        determine, based on the sensor data, a first plurality of boundary points defining a first polygon in the image of the geographic area;
        detect, based at least on the first plurality of boundary points, an overlap between the first polygon and a second polygon in the image of the geographic area, wherein the overlap comprises an intersection between a first region of the first polygon and a second region of the second polygon;
        in response to detecting the overlap, modify at least one of the first polygon or the second polygon to remove the overlap between the first polygon and the second polygon;
        determine a reconstruction limitation of the at least one of the first polygon or the second polygon associated with a removal of the overlap between the first polygon and the second polygon;
        remove the at least one of the first polygon or the second polygon associated with the reconstruction limitation; and
        generate, based on the removing of the at least one of the first polygon or the second polygon, a first annotation corresponding to the first polygon, the first annotation identifying a physical feature within the geographic area.

14. The system of claim 13, wherein the overlap comprises an intersection between a first edge of the first polygon and a second edge of the second polygon, and wherein the modifying includes reducing, using the at least one processor, the at least one of the first polygon or the second polygon to prevent the first edge from intersecting the second edge.

15. The system of claim 13, wherein the at least one of the first polygon or the second polygon are reduced by adjusting at least one of the first plurality of boundary points comprising the first polygon or a second plurality of boundary points comprising the second polygon.

16. The system of claim 13, wherein the overlap comprises an intersection between a first region of the first polygon and a second region of the second polygon, and wherein the modifying includes removing the first region from the first polygon and the second region from the second polygon.

17. The system of claim 13, wherein the processor is further configured to:
   determine that a polygon cannot be constructed from a remaining plurality of boundary points upon removing the first region from the first polygon; and
   in response to determining that the polygon cannot be reconstructed from the remaining plurality of boundary points upon removing the first region from the first polygon, modify the first polygon by removing the first polygon from the image.

18. The system of claim 13, wherein the processor is further configured to:
   identify, based on the modified image, a third polygon corresponding to an empty space between the first polygon and the second polygon; and
   generate a second annotation corresponding to the third polygon, the second annotation identifying another physical feature within the geographic area.

19. The system of claim 18, wherein each of the first polygon and the second polygon comprise at least a portion of a traffic lane, and wherein the third polygon comprises an intersection between two or more traffic lanes.

20. At least one non-transitory storage media storing instructions that, when executed by a computing system comprising a processor, cause the computing system to at least:
   obtain sensor data representing an image of a geographic area;
   determine, based on the sensor data, a first plurality of boundary points defining a first polygon in the image of the geographic area;
   detect, based at least on the first plurality of boundary points, an overlap between the first polygon and a second polygon in the image of the geographic area, wherein the overlap comprises an intersection between a first region of the first polygon and a second region of the second polygon;
   in response to detecting the overlap, modify at least one of the first polygon or the second polygon to remove the overlap between the first polygon and the second polygon;
   determine a reconstruction limitation of the at least one of the first polygon or the second polygon associated with a removal of the overlap between the first polygon and the second polygon;
   remove the at least one of the first polygon or the second polygon associated with the reconstruction limitation; and
   generate, based on the removing of the at least one of the first polygon or the second polygon, a first annotation corresponding to the first polygon, the first annotation identifying a physical feature within the geographic area.

* * * * *